(12) United States Patent
Minamisawa et al.

(10) Patent No.: US 11,181,750 B2
(45) Date of Patent: Nov. 23, 2021

(54) COIL UNIT, MANUFACTURING METHOD FOR COIL UNIT AND PHOTOGRAPHING OPTICAL DEVICE

(71) Applicant: NIDEC SANKYO CORPORATION, Nagano (JP)

(72) Inventors: Shinji Minamisawa, Nagano (JP); Kazuhiko Yanagisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 668 days.

(21) Appl. No.: 15/205,354

(22) Filed: Jul. 8, 2016

(65) Prior Publication Data

US 2017/0010475 A1 Jan. 12, 2017

(30) Foreign Application Priority Data

Jul. 8, 2015 (JP) .............................. JP2015-136653

(51) Int. Cl.
*G02B 27/64* (2006.01)
*H02K 3/04* (2006.01)
(Continued)

(52) U.S. Cl.
CPC ............. *G02B 27/646* (2013.01); *G03B 5/02* (2013.01); *H02K 3/04* (2013.01); *H02K 3/47* (2013.01);
(Continued)

(58) Field of Classification Search
CPC . G02B 7/02; G02B 7/023; G02B 7/04; G02B 7/10; G02B 7/102; G02B 7/105; G02B 13/001; G02B 27/64; G02B 27/646; G03B 17/00; G03B 3/10; G03B 5/00; G03B 5/02; G03B 2205/0023; G03B 2205/0038; G03B 2205/0053; G03B 2205/0069; G03B 2205/0015; G01R 7/08; H02K 1/06; H02K 3/00; H02K 3/04; H02K 3/46; H02K 3/47; H02K 15/08; H02K 33/18; H02K 41/0356; B23K 2203/00; B23K 2203/04;
(Continued)

(56) References Cited

U.S. PATENT DOCUMENTS

| 2010/0098394 A1* | 4/2010 | Ishihara | G02B 27/646 396/55 |
| 2012/0048042 A1* | 3/2012 | Tanaka | F16H 25/2015 74/89.23 |
| 2016/0124242 A1* | 5/2016 | Minamisawa | G03B 5/00 359/557 |

FOREIGN PATENT DOCUMENTS

| JP | 2011081288 A | 4/2011 | |
| JP | 2014006522 A * | 1/2014 | ............... G03B 5/00 |

* cited by examiner

*Primary Examiner* — Marin Pichler
*Assistant Examiner* — Mitchell T Oestreich
(74) *Attorney, Agent, or Firm* — Cantor Colburn LLP (57) ABSTRACT

A coil unit may include a coil in a substantially rectangular frame shape; and a coil holding member. A thickness direction of the coil may be perpendicular to a long side of the coil and a short side of the coil. An outer peripheral face of the coil holding member may include an abutting face in a flat shape with which the coil is abutted. A protruded part may be formed formed so as to protrude from the abutting face to an outer side of the coil holding member. A protruded part end face parallel to the abutting face may be formed on a tip end side of the protruded part in a protruding direction of the protruded part. A distance between the abutting face and the protruded part end face may be equal to a thickness of the coil.

14 Claims, 7 Drawing Sheets

(51) Int. Cl.
  *H02K 15/08* (2006.01)
  *H04N 5/225* (2006.01)
  *H02K 3/47* (2006.01)
  *H02K 33/18* (2006.01)
  *H04N 5/232* (2006.01)
  *G03B 5/02* (2021.01)

(52) U.S. Cl.
  CPC .............. *H02K 15/08* (2013.01); *H02K 33/18* (2013.01); *H04N 5/2254* (2013.01); *H04N 5/2257* (2013.01); *H04N 5/23287* (2013.01); *G03B 2205/0015* (2013.01); *G03B 2205/0069* (2013.01)

(58) Field of Classification Search
  CPC .... B23K 2203/05; B23K 26/20; B23K 26/24; H04N 5/222; H04N 5/225; H04N 5/2251; H04N 5/2252; H04N 5/2253; H04N 5/2254; H04N 5/2257; H04N 5/232; H04N 5/23248; H04N 5/23258; H04N 5/23264; H04N 5/2328; H04N 2005/027; H04N 5/23287; H01F 27/28; H01F 27/2823; H01F 41/02; H01F 41/04; H01F 41/06; H01F 41/061; H01F 41/064; H01F 41/068; H01F 41/096; H01F 41/098; H05K 1/18; Y10T 29/49073; Y10T 403/47; Y10T 403/477; Y10T 403/478
  USPC .................. 359/55, 554, 557, 813, 814, 824; 348/208.11, 208.2; 335/209, 296, 297; 310/12.16; 242/430, 433, 433.1; 396/52, 396/55; 403/265, 270, 271
  See application file for complete search history.

COIL UNIT, MANUFACTURING METHOD FOR COIL UNIT AND PHOTOGRAPHING OPTICAL DEVICE

CROSS REFERENCE TO RELATED APPLICATION

The present invention claims priority under 35 U.S.C. § 119 to Japanese Application No. 2015-136653 filed Jul. 8, 2015, the entire content of which is incorporated herein by reference.

FIELD OF THE INVENTION

At least an embodiment of the present invention may relate to a coil unit which includes coils and a coil holding member holding the coils and relate to its manufacturing method. Further, at least an embodiment of the present invention may relate to a photographing optical device which includes the coil unit.

BACKGROUND

A photographing optical device has been conventionally known which is provided with a shake correction function for correcting a shake such as a hand shake (see, for example, Japanese Patent Laid-Open No. 2011-81288). The photographing optical device described in the Patent Literature includes a movable module having a lens and an imaging element, a support body which swingably supports the movable module, a plate spring which connects the movable module with the support body, and a swing drive mechanism structured to swing the movable module with respect to the support body for correcting a shake. The swing drive mechanism includes four drive magnets and four drive coils respectively disposed oppositely to the four drive magnets.

In the photographing optical device described in the above-mentioned Patent Literature, the drive magnets are fixed to an outer peripheral face of the movable module which is formed in a substantially quadrangular prism shape. The drive coil is an air-core coil. The support body includes a case body formed in a substantially rectangular tube shape and the drive coils are fixed to an inner peripheral face of the case body. Specifically, the drive coils are fixed to the inner peripheral face of the case body by an adhesive applied to the inner peripheral face of the case body.

In the photographing optical device described in the Patent Literature, four drive coils which are air-core coils are respectively fixed to the inner peripheral face of the case body formed in a substantially rectangular tube shape by an adhesive. The fixing work for the drive coils with the use of an adhesive is performed by hand and thus attaching work of the drive coils to the case body is complicated.

SUMMARY

In view of the problem described above, at least an embodiment of the present invention may advantageously provide a coil unit which includes a coil and a coil holding member holding the coil, in which the coil can be easily attached to the coil holding member, and provide its manufacturing method. Further, at least an embodiment of the present invention may advantageously provide a photographing optical device including the coil unit.

According to at least an embodiment of the present invention, there may be provided a coil unit including a coil which is formed in a substantially rectangular frame shape, and a coil holding member which holds the coil. When a direction perpendicular to a parallel direction to a long side of the coil formed in the substantially rectangular frame shape and a parallel direction to a short side of the coil is a thickness direction of the coil, an outer peripheral face of the coil holding member is formed with an abutting face in a flat face shape with which one end face in the thickness direction of the coil is abutted, a protruded part around which the coil is directly wound is formed so as to protrude from the abutting face to an outer side of the coil holding member, a protruded part end face in a flat face shape which is parallel to the abutting face is formed on a tip end side of the protruded part in a protruding direction of the protruded part, and a distance between the abutting face and the protruded part end face is equal to a thickness of the coil.

Further, according to at least an embodiment of the present invention, there may be provided a manufacturing method for a coil unit with a use of a winding device having a winding main body part which is rotatable and to which a coil holding member holding a coil is fixed, a supply nozzle structured to supply a conducting wire for structuring the coil, and a subordinate head structured to rotate together with the winding main body part. The manufacturing method includes previously providing the coil holding member, in which, when a direction perpendicular to a parallel direction to a long side of the coil formed in the substantially rectangular frame shape and a parallel direction to a short side of the coil is a thickness direction of the coil, an outer peripheral face of the coil holding member is formed with an abutting face in a flat face shape with which one end face in the thickness direction of the coil is abutted, a protruded part around which the coil is directly wound is formed so as to protrude from the abutting face to an outer side of the coil holding member, a protruded part end face in a flat face shape which is parallel to the abutting face is formed on a tip end side of the protruded part in a protruding direction of the protruded part, and a distance between the abutting face and the protruded part end face is equal to a thickness of the coil. The manufacturing method further includes previously providing the subordinate head so as to face the side face of the coil holding member fixed to the winding main body part, and the subordinate head is formed with a contact face in a flat face shape configured to contact with the protruded part end face of the coil holding member. The manufacturing method further includes rotating the subordinate head and the winding main body part in a state that the contact face of the subordinate head is abutted with the protruded part end face of the coil holding member and thereby the conducting wire is directly wound around the protruded part to structure the coil on the coil holding member.

In the coil unit and the manufacturing method for a coil unit in accordance with at least an embodiment of the present invention, a coil is directly wound around a protruded part which is formed on an outer peripheral face of a coil holding member. In other words, according to at least an embodiment of the present invention, a coil is directly wound around the protruded part by using a winding device and the coil is attached to the coil holding member as it is. Therefore, according to at least an embodiment of the present invention, the coil can be easily attached to the coil holding member. Further, in at least an embodiment of the present invention, a protruded part end face which is parallel to an abutting face to which one end face of the coil in a thickness direction of the coil is abutted is formed on a tip end side of the protruded part, and a distance between the abutting face and the protruded part end face is equal to the thickness of the coil. Therefore, according to at least an embodiment of the present invention, when a coil is directly wound around the protruded part in a state that a flat face portion of a winding jig, specifically, a flat face portion of a subordinate head is abutted with the protruded part end face, the coil is orderly wound around the protruded part while preventing winding collapse of the coil.

In at least an embodiment of the present invention, the coil unit includes a terminal pin made of metal with which an end part of the coil is bound and electrically connected, and the outer peripheral face of the coil holding member is formed with two side-face pairs each of which is comprised of a pair of side faces parallel to each other, and the two side-face pairs are disposed so as to be perpendicular to each other. The abutting face and the protruded part are formed on the side face and, when a direction perpendicular to a perpendicular direction to the side faces structuring one of the two side-face pairs and perpendicular to a perpendicular direction to the side faces structuring the other of the two side-face pairs is referred to as a first direction, the terminal pin is formed in a polygonal column shape, and the terminal pin is fixed to one end face in the first direction of the coil holding member so as to protrude from the one end face of the coil holding member in the first direction. Further, it is preferable that after a conducting wire is bound around the terminal pin, the conducting wire is directly wound around the protruded part. According to this structure, the terminal pin is formed in a polygonal column shape and thus loosening of an end part of the coil bound around the terminal pin can be prevented. Further, according to this structure, the terminal pin is fixed to one end face of the coil holding member in the first direction so as to protrude from one end face of the coil holding member in the first direction. Therefore, the coil is prevented from being caught by the terminal pin when the coil is directly wound around the protruded part.

In at least an embodiment of the present invention, in a case that a side face portion of the protruded part with which a winding-start side portion of the coil is first come into contact when the coil is to be directly wound around the protruded part is referred to as a winding-start contact part, a coil introducing part which is recessed from the abutting face is formed on the side face of the coil holding member between the winding-start contact part and the terminal pin to which an end part on a winding-start side of the coil is fixed. In this case, it is preferable that a recessed amount of the coil introducing part from the abutting face is equal to an outer diameter of a conducting wire structuring the coil or more. For example, the recessed amount of the coil introducing part from the abutting face is equal to the outer diameter of the conducting wire. According to this structure, when the coil is to be wound around the protruded part by alignment winding, a conducting wire can be wound on the winding-start contact part from the terminal pin through the coil introducing part and thus the conducting wire of the second and succeeding windings for the coil can be prevented from riding on the conducting wire of the winding-start of the coil. Therefore, the coil can be orderly wound around the protruded part by alignment winding.

In at least an embodiment of the present invention, a width of the coil introducing part in a second direction which is perpendicular to the thickness direction of the coil and the first direction becomes gradually wider as going to the one end face in the first direction of the coil holding member to which the terminal pin is fixed. In this case, for example, the coil holding member can be relatively easily manufactured by using a die which is capable of being divided in the first direction.

In at least an embodiment of the present invention, the coil unit includes a circuit board having a solder land to which the terminal pin is soldered. According to this structure, an electric current can be supplied to the coil through the terminal pin and the circuit board and thus a leading-around distance of the coil can be shortened.

In at least an embodiment of the present invention, the outer peripheral face of the coil holding member is formed with two side-face pairs each of which is comprised of a pair of side faces parallel to each other, the two side-face pairs are disposed so as to be perpendicular to each other, the abutting face and the protruded part are formed on the side face and, when a direction perpendicular to a perpendicular direction to the side faces structuring one of the two side-face pairs and perpendicular to a perpendicular direction to the side faces structuring the other of the two side-face pairs is referred to as a first direction, each of both ends of the abutting face in the first direction is connected with each of both end faces of the coil holding member in the first direction through a curved face part formed in a convex curved surface shape. According to this structure, when the coil is to be directly wound around the protruded part, for example, when a conducting wire is to be directly wound around the protruded part after the conducting wire is bound around the terminal pin, the coil can be restrained from being caught at a boundary portion between both end faces in the first direction of the coil holding member and the abutting face.

In at least an embodiment of the present invention, the protruded part is formed with a second protruded part so as to protrude from the protruded part end face to an outer side of the coil holding member. According to this structure, when the coil unit is handled, the coil is hard to be contacted with other members. Therefore, damage of the coil can be prevented when the coil unit is handled. Further, according to this structure, for example, when the coil and the magnet are to be oppositely disposed to each other in a predetermined device on which the coil unit is mounted, contact of the coil with the magnet can be prevented by the second protruded part.

In at least an embodiment of the present invention, the protruded part is formed with a second protruded part so as to protrude from the protruded part end face to an outer side of the coil holding member, the contact face of the subordinate head is formed with a recessed part into which the second protruded part is capable of entering and, when the contact face of the subordinate head is abutted with the protruded part end face of the coil holding member, the second protruded part is entered into the recessed part and, in this state, the subordinate head and the winding main body part are rotated together to directly wind the conducting wire around the protruded part.

The coil unit in accordance with an embodiment of the present invention may be used in a photographing optical device which includes a camera module having a lens and an imaging element and being fixed to the coil holding member of the coil unit, a support body which swingably holds the coil unit, and a drive magnet which is fixed to the support body and is oppositely disposed to the coil. In the photographing optical device, the coil can be attached to the coil holding member easily. Further, in the photographing optical device, a coil is directly wound around the protruded part in a state that a flat face portion of a winding jig is abutted with the protruded part end face and thereby the coil is orderly wound around the protruded part while preventing winding collapse of the coil.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Embodiments of the present invention will be described below with reference to the accompanying drawings.

(Entire Structure of Photographing Optical Device)

Figure 1:
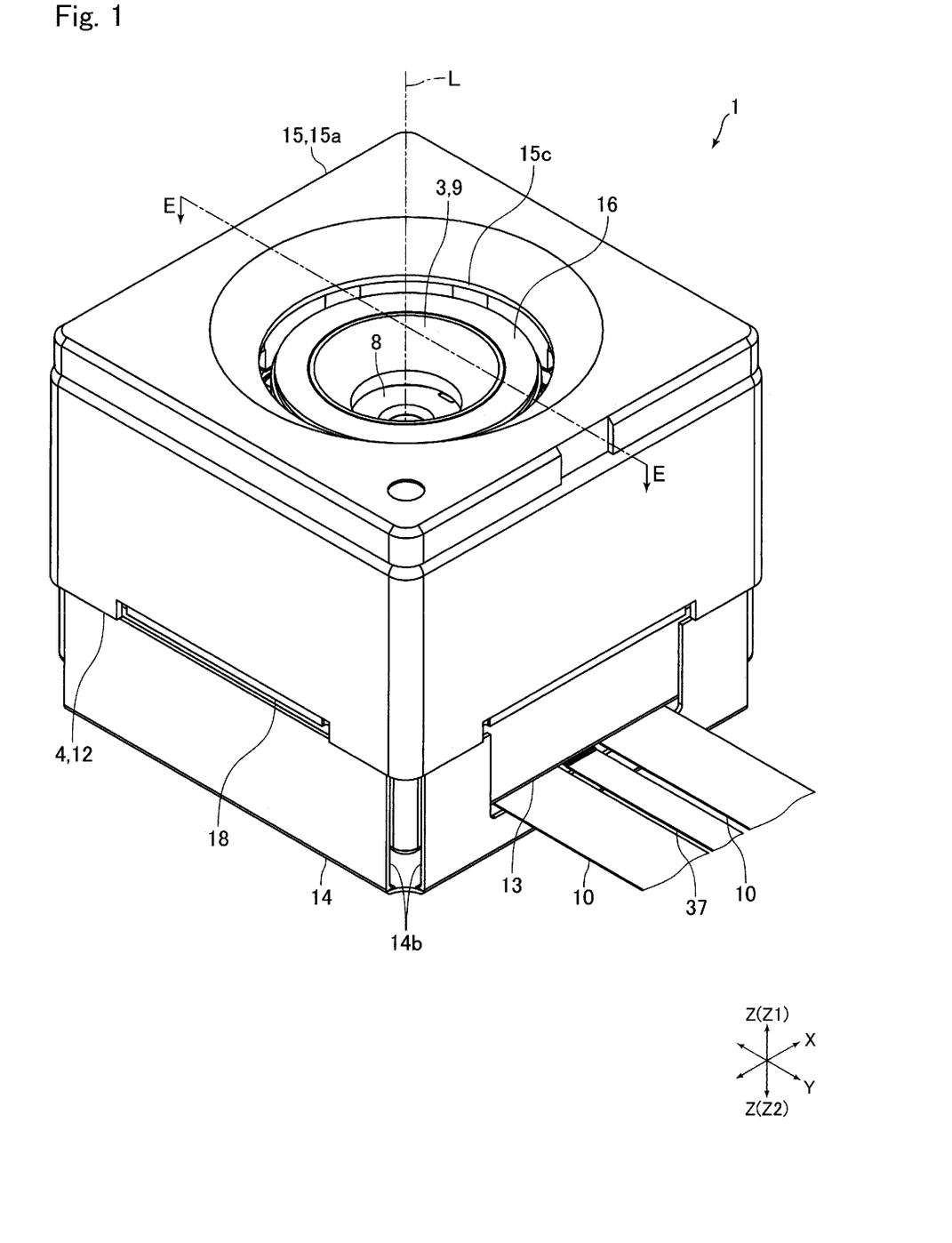
FIG. 1 is a perspective view showing a photographing optical device on which a coil unit in accordance with an embodiment of the present invention is mounted.
Figure 2:
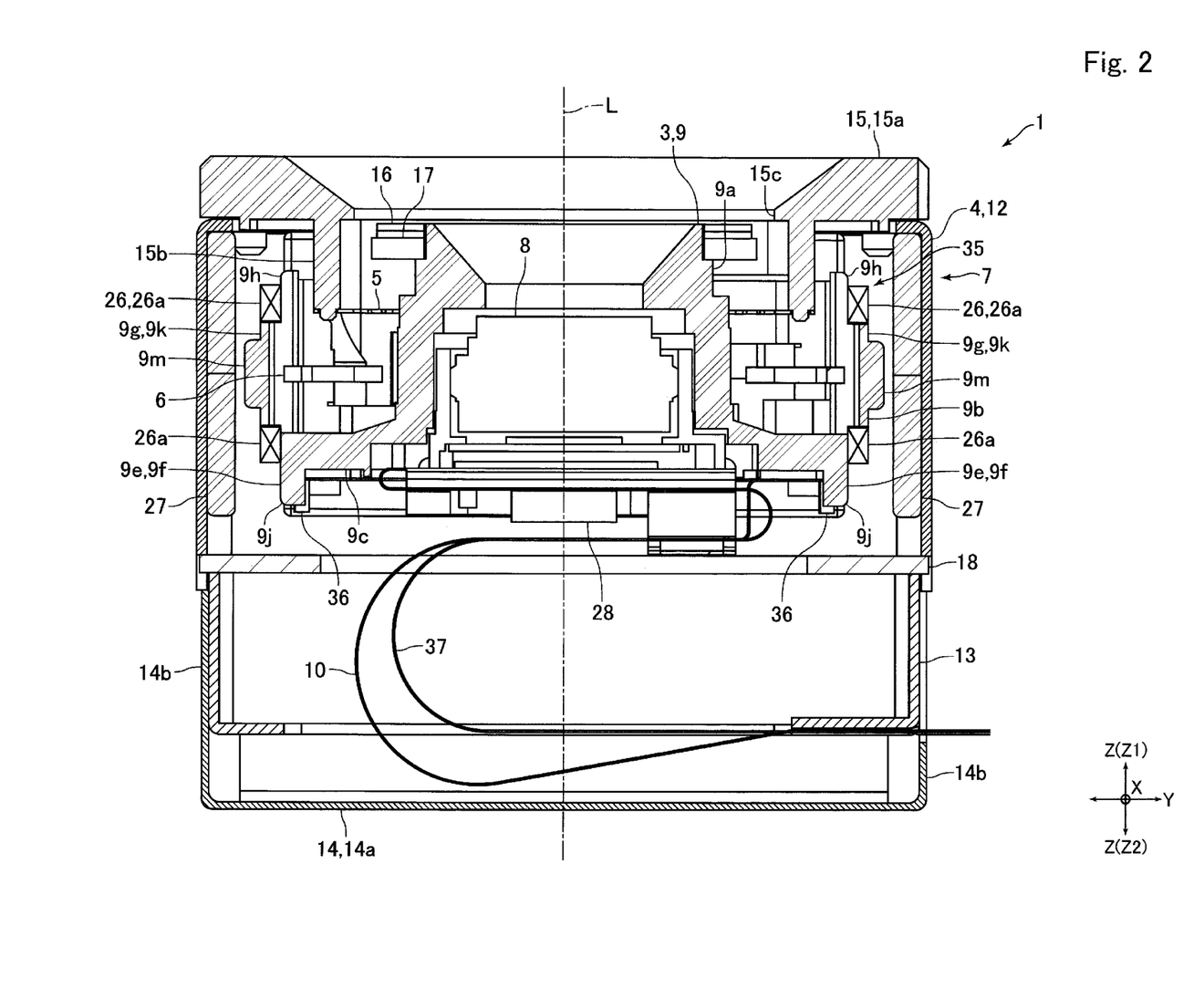
FIG. 2 is a cross-sectional view showing the "E-E" cross section in FIG. 1.
Figure 3:
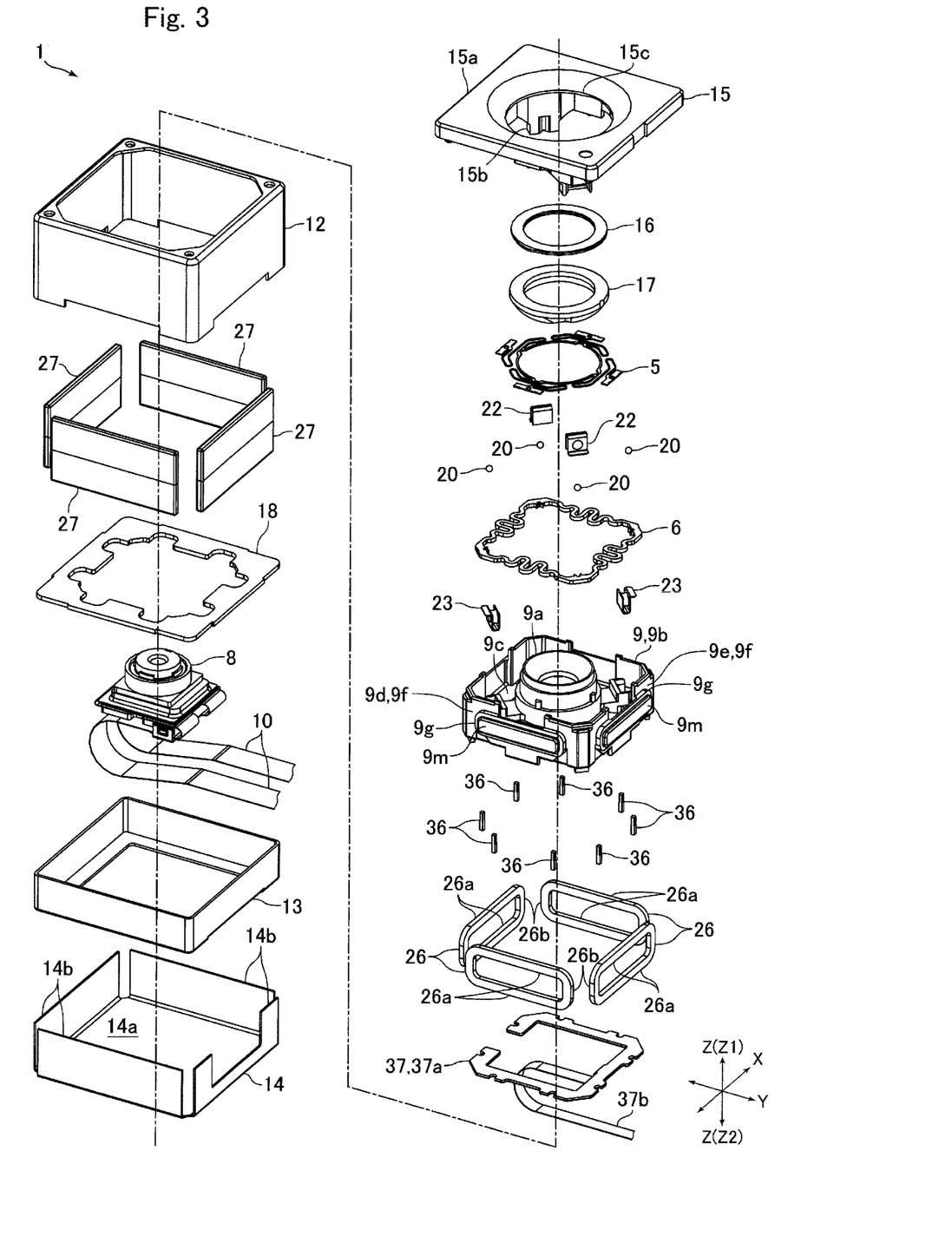
FIG. 3 is an exploded perspective view showing the photographing optical device in FIG. 1.

FIG. 1 is a perspective view showing a photographing optical device 1 on which a coil unit 35 in accordance with an embodiment of the present invention is mounted. FIG. 2 is a cross-sectional view showing the "E-E" cross section in FIG. 1. FIG. 3 is an exploded perspective view showing the photographing optical device 1 in FIG. 1. In the following descriptions, as shown in FIG. 1 and the like, respective three directions perpendicular to each other are referred to as an "X" direction, a "Y" direction and a "Z" direction, and the "X" direction is referred to as a right and left direction, the "Y" direction is referred to as a front and rear direction, and the "Z" direction is referred to as an upper and lower direction. Further, a "Z1" direction side in FIG. 1 and the like is an "upper" side and a "Z2" direction side is a "lower" side.

A photographing optical device 1 in this embodiment is a small and thin camera which is mounted on a portable apparatus such as a cell phone, a drive recorder, a monitor camera system or the like and is provided with a shake correction function for correcting a shake such as a hand shake. The photographing optical device 1 is formed in a substantially rectangular parallelepiped shape as a whole. In this embodiment, the photographing optical device 1 is formed in a substantially square shape when viewed in a direction of an optical axis "L" (optical axis direction) of a lens for photographing, and four side faces of the photographing optical device 1 are substantially parallel to the "Z-X" plane structured of the right and left direction and the upper and lower direction, or the "Y-Z" plane structured of the front and rear direction and the upper and lower direction.

The photographing optical device 1 includes a movable module 3 on which a lens for photographing and an imaging element are mounted, a support body 4 which swingably holds the movable module 3, a spring member 5 connecting the movable module 3 with the support body 4, and a movable frame 6. Further, the photographing optical device 1 includes a shake correction mechanism 7 structured to swing the movable module 3 with respect to the support body 4 to correct a shake such as a hand shake (see FIG. 2). In this embodiment, the upper and lower direction is substantially coincided with an optical axis direction of the movable module 3 when the movable module 3 is not swung. Further, in this embodiment, an imaging element is mounted on a lower end side of the movable module 3 and an object disposed on an upper side is photographed.

The movable module 3 is formed in a substantially quadrangular prism shape whose shape when viewed in the optical axis direction is a substantially square shape as a whole. The movable module 3 includes a camera module 8 having a lens and an imaging element, and a holder 9 to which the camera module 8 is fixed. The camera module 8 includes, for example, a movable body which holds the lens and is movable in an optical axis direction, a holding body which movably holds the movable body in the optical axis direction, a plate spring which connects the movable body with the holding body, and a lens drive mechanism structured to drive the movable body in the optical axis direction. In other words, the camera module 8 includes an autofocus mechanism. A flexible printed circuit board 10 is extended out from a lower end side of the camera module 8. In accordance with an embodiment of the present invention, the camera module 8 may include no autofocus mechanism.

The holder 9 is formed of resin material having heat resistance and insulation property. The holder 9 is formed in a substantially tube shape whose outward shape when viewed in the optical axis direction is a substantially square shape. The camera module 8 is fixed to an inner peripheral side of the holder 9 so that an outer peripheral side of the camera module 8 is covered by the holder 9. An axial direction of the holder 9 formed in a substantially tube shape is coincided with the optical axis direction. Weights 16 and 17 for adjusting balance of the movable module 3 are fixed to an upper end side of the holder 9. The holder 9 in this embodiment is a coil holding member which holds shake correction coils 26 described below structuring the shake correction mechanism 7.

The support body 4 includes a case body 12 which structures four side faces on front and rear sides and right and left sides of an upper end side portion of the support body 4, a lower case body 13 and a cover member 14 which structure a lower end side portion of the support body 4, and a cover member 15 which structures an upper end face of the support body 4. In this embodiment, the case body 12 structures four side faces on front and rear sides and right and left sides of an upper end side portion of the photographing optical device 1, and the lower case body 13 and the cover member 14 structure a lower end side portion of the photographing optical device 1, and the cover member 15 structures an upper end face of the photographing optical device 1.

The case body 12 is formed in a substantially rectangular tube shape. The case body 12 is disposed so as to cover the movable module 3 and the shake correction mechanism 7 from an outer peripheral side. The cover member 15 is fixed to an upper end face of the case body 12. The cover member 15 is structured of an upper face part 15*a* formed in a substantially square flat plate shape and a protruded part 15*b* protruded from an under face of the upper face part 15*a* to a lower side. A circular through-hole 15*c* is formed at a center of the upper face part 15*a*. The protruded part 15*b* is formed in a substantially square frame shape and is protruded from an edge of the through-hole 15*c* to a lower side. The lower case body 13 is formed in a substantially rectangular tube shape. The cover member 14 is structured of a bottom face part 14*a* covering a lower end of the lower case body 13 and four side face parts 14*b* covering an outer peripheral side of the lower case body 13. A stopper 18 for restricting a swing range of the movable module 3 is fixed between a lower end of the case body 12 and an upper end of the lower case body 13.

A spring member 5 is a plate spring and is formed in a flat plate shape. The spring member 5 is provided with a movable side fixed part which is fixed to an upper end side of the movable module 3 (specifically, an upper end side of the holder 9), a support side fixed part which is fixed to an upper end side of the support body 4 (specifically, protruded parts 15*b* of the cover member 15), and a plurality of arm parts which connect the movable side fixed part with the support side fixed part. The spring member 5 functions to maintain posture of the movable module 3 when an electric current is not supplied to shake correction coils 26 described below which structure the shake correction mechanism 7.

The movable frame 6 is an elastic member which is formed in a plate shape as a whole and in a substantially square frame shape. The movable frame 6 is disposed so that its four sides are substantially parallel to the front and rear direction or the right and left direction. A center part of each of sides of the movable frame 6 which is formed in a substantially square frame shape is formed with a meandering part which meanders with respect to the front and rear direction or the right and left direction. A spherical body 20 formed in a spherical shape is fixed to each of inner sides of four corners of the movable frame 6. The spherical body 20 is formed of metal material and is joined to the movable frame 6 by laser welding.

Among four spherical bodies 20, two spherical bodies 20 which are disposed on one diagonal line of the movable frame 6 are supported by support members 22 which turnably support the spherical bodies 20, and two remaining spherical bodies 20 are supported by support members 23 which turnably support the spherical bodies 20. The support members 22 and 23 are plate springs which are formed by bending a thin metal plate in a predetermined shape. The support member 22 is fixed to a lower end side of the protruded part 15*b* of the cover member 15. The support member 23 is fixed to an upper end side of the holder 9. Each of the support members 22 and 23 is formed with a recessed part in a hemispheric shape in which a part of the spherical body 20 is disposed. Each of the support members 22 and 23 holds the spherical body 20 from an inner peripheral side with respect to the movable frame 6. In this embodiment, a gimbal mechanism is structured between the movable module 3 and the support body 4. The movable module 3 is swingably supported by the support members 22 around a first axial line with respect to the support body 4 and is swingably supported by the support members 23 around a second axial line through the movable frame 6 used in the gimbal mechanism.

The shake correction mechanism 7 includes shake correction coils 26 as coils which are respectively fixed to four side faces of the holder 9 and shake correction magnets 27 as drive magnets which are respectively fixed to four inner side faces of the case body 12. In other words, the shake correction mechanism 7 includes four shake correction coils 26 and four shake correction magnets 27. The shake correction coil 26 is formed by winding a conducting wire in a substantially rectangular frame shape. In other words, the shake correction coil 26 is formed in a substantially rectangular frame shape. The shake correction magnet 27 is formed in a rectangular flat plate shape and is fixed to an inner side face of the case body 12 so as to face the shake correction coil 26. In this embodiment, a coil unit 35 (see FIG. 4) is structured of the holder 9, four shake correction coils 26, eight terminal pins 36 described below and a flexible printed circuit board 37. The coil unit 35 is swingably held by the support body 4. A detailed structure of the coil unit 35 will be described below.

In the photographing optical device 1 structured as described above, when a variation of inclination of the movable module 3 is detected by a gyroscope 28 (see FIG. 2) which is attached to a lower end face of the movable module 3, an electric current is supplied to the shake correction coils 26 based on a detected result by the gyroscope 28. Further, when an electric current is supplied to the shake correction coils 26, the movable module 3 is swung around the first axial line supported by the support members 22 with respect to the support body 4 and/or is swung around the second axial line supported by the support members 23 through the movable frame 6 used in the gimbal mechanism and thereby the shake is corrected.

(Structure of Coil Unit)

Figure 4:
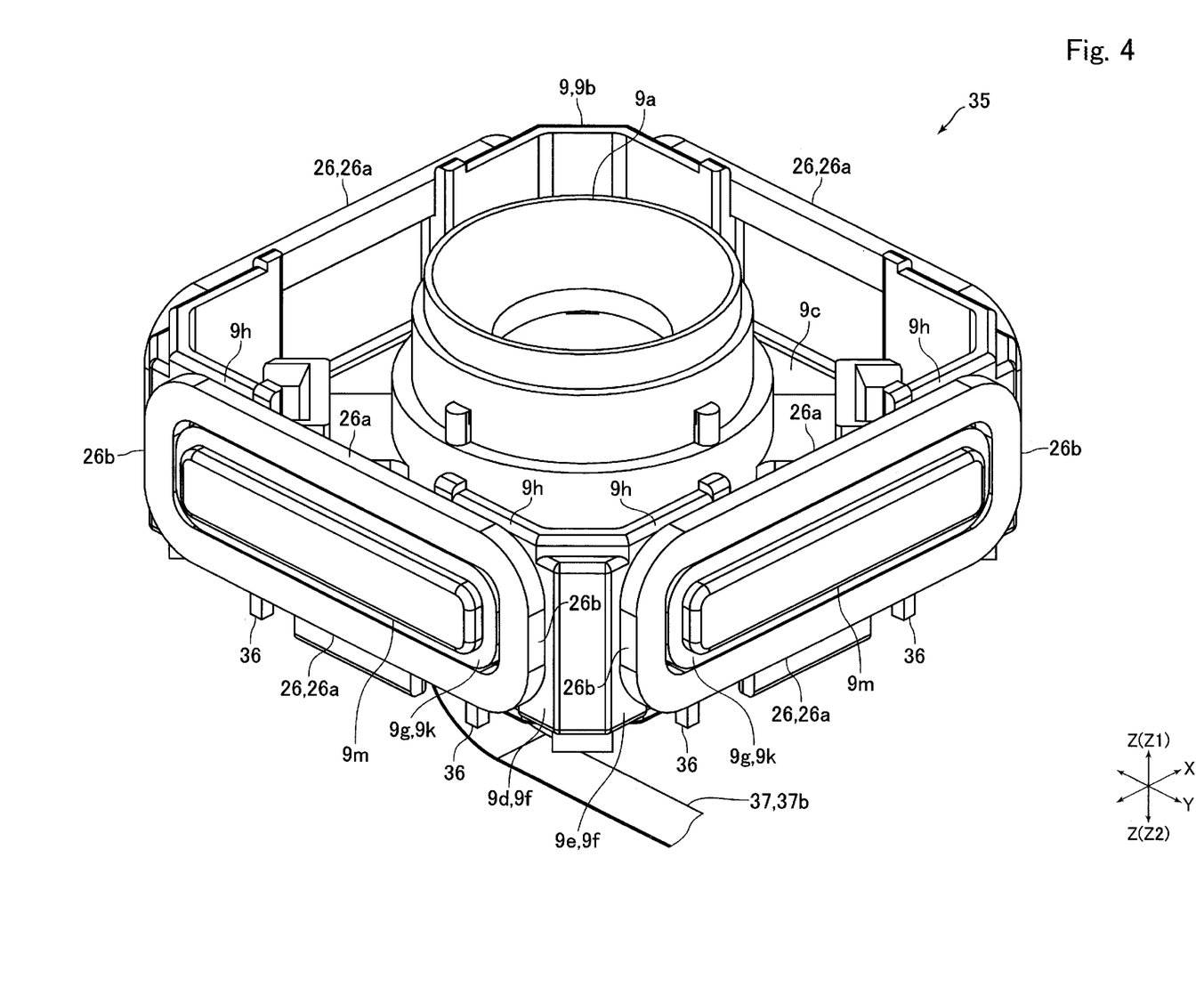
FIG. 4 is a perspective view showing a coil unit in accordance with an embodiment of the present invention.
Figure 5:
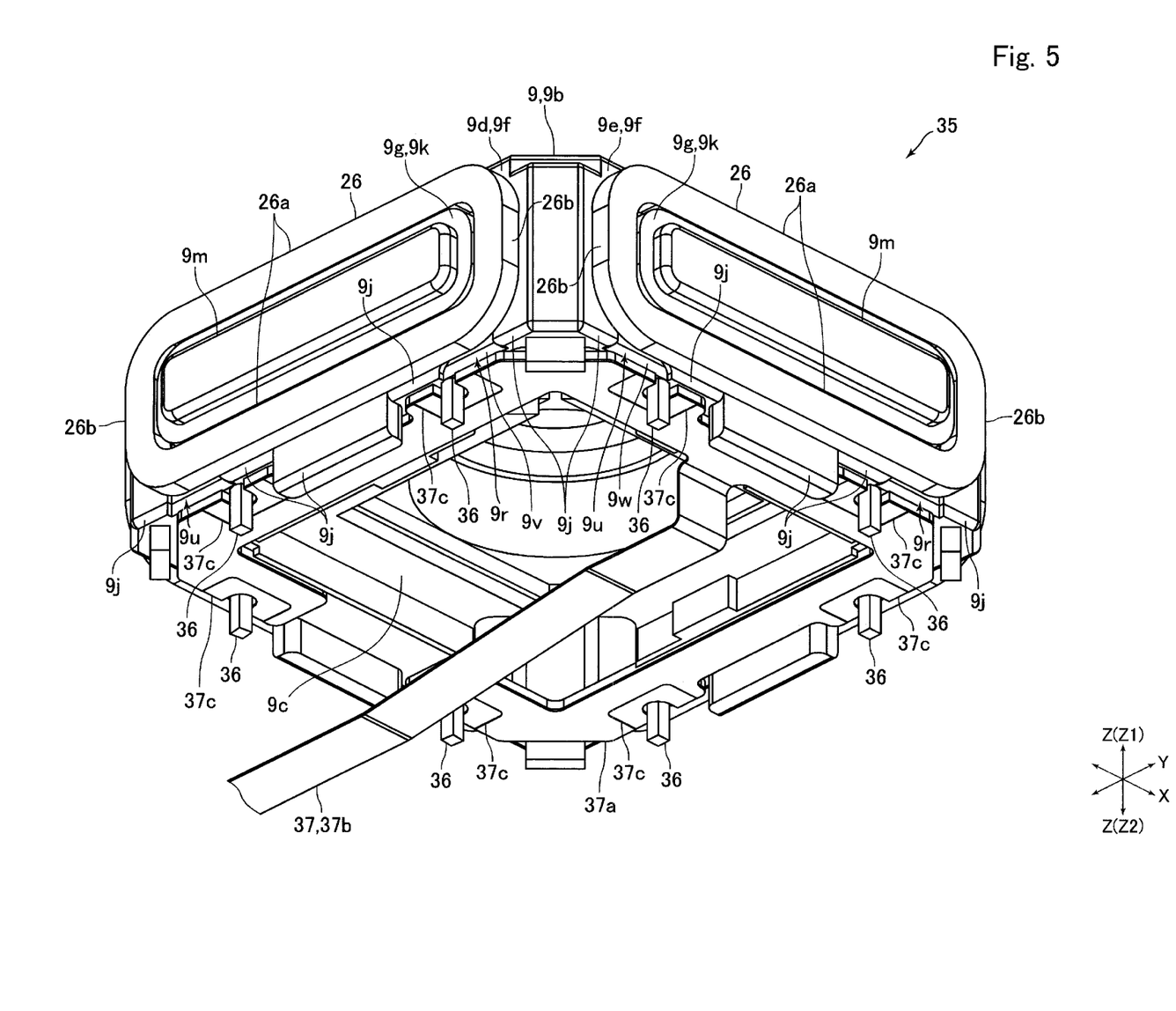
FIG. 5 is a perspective view showing the coil unit in FIG. 4 which is viewed in another direction.
Figure 6:
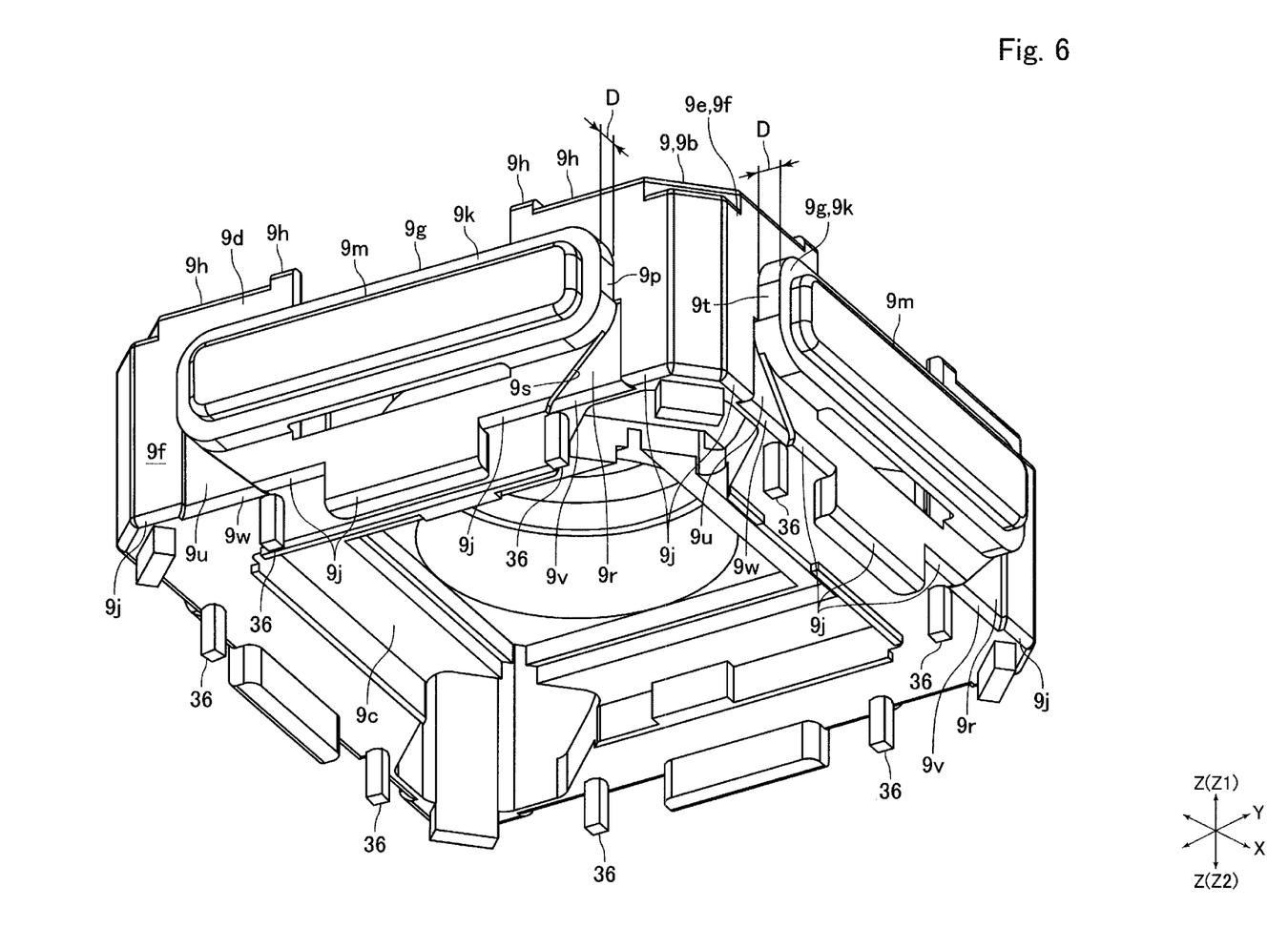
FIG. 6 is a perspective view showing a holder and terminal pins in FIG. 5.

FIG. 4 is a perspective view showing the coil unit 35 in accordance with an embodiment of the present invention. FIG. 5 is a perspective view showing the coil unit 35 in FIG. 4 which is viewed in another direction. FIG. 6 is a perspective view showing the holder 9 and the terminal pins 36 in FIG. 5.

The coil unit 35 includes the holder 9 and four shake correction coils 26. Further, the coil unit 35 includes eight terminal pins 36 made of metal with each of which an end part of the shake correction coil 26 is bound and electrically connected, and a flexible printed circuit board 37 as a circuit board to which eight terminal pins 36 are soldered and electrically connected. As described above, the shake correction coil 26 is formed in a substantially rectangular frame shape and is structured of two long side parts 26*a* and two short side parts 26*b* shorter than the long side part 26*a*.

The holder 9 is formed in a substantially tube shape as described above. Specifically, the holder 9 is formed in a double tube shape which is structured of an inner tube part 9*a* formed in a substantially cylindrical tube shape, an outer tube part 9*b* which is formed in a substantially rectangular tube shape and is disposed to an outer peripheral side of the inner tube part 9*a,* and a bottom part 9*c* which connects a lower end of the inner tube part 9*a* with a lower end of the outer tube part 9*b*. A camera module 8 is fixed to an inner peripheral side of the inner tube part 9*a*. Further, an outward form of the holder 9 when viewed in the upper and lower direction is a substantially a square shape. In other words, an outer peripheral face of the holder 9 (specifically, outer peripheral face of the outer tube part 9*b*) when viewed in the upper and lower direction is formed in a substantially square shape. The outer peripheral face of the holder 9 is formed of two side faces 9*d* substantially perpendicular to the right and left direction and parallel to each other and two side faces 9*e* substantially perpendicular to the front and rear direction and parallel to each other.

In other words, the outer peripheral face of the holder 9 is formed of a side-face pair comprised of a pair of side faces 9d parallel to each other and a side-face pair comprised of a pair of side faces 9e parallel to each other. The two side-face pairs are disposed so as to be perpendicular to each other. The upper and lower direction in this embodiment is a first direction, which is perpendicular to the right and left direction that is a perpendicular direction to the side faces 9d structuring one of the two side-face pairs and perpendicular to the front and rear direction that is a perpendicular direction to the side faces 9e structuring the other of the two side-face pairs.

When a direction perpendicular to a direction parallel to a long side of the shake correction coil 26 formed in a substantially rectangular frame shape (in other words, a direction parallel to the long side part 26a) and to a direction parallel to a short side of the shake correction coil 26 (in other words, a direction parallel to the short side part 26b) is referred to as a thickness direction of the shake correction coil 26, each of the side faces 9d and 9e is formed with an abutting face 9f in a flat face shape with which one end face in the thickness direction of the shake correction coil 26 is abutted. Further, each of the side faces 9d and 9e is formed with a protruded part 9g around which the shake correction coil 26 is to be directly wound so as to protrude to an outer side of the holder 9 from the abutting face 9f. In other words, the side face 9d is formed with the protruded part 9g protruding to an outer side in the right and left direction, and the side face 9e is formed with the protruded part 9g protruding to an outer side in the front and rear direction.

The abutting face 9f formed on the side face 9d is formed in a flat face shape perpendicular to the right and left direction, and the abutting face 9f formed on the side face 9e is formed in a flat face shape perpendicular to the front and rear direction. The protruded part 9g formed on the side face 9d is formed in a substantially rectangular shape whose longitudinal direction is the front and rear direction and its short-side direction is the upper and lower direction when viewed in the right and left direction (specifically, a substantially rectangular shape whose four corners are rounded). The protruded part 9g formed on the side face 9e is formed in a substantially rectangular shape whose longitudinal direction is the right and left direction and its short-side direction is the upper and lower direction when viewed in the front and rear direction (specifically, a substantially rectangular shape whose four corners are rounded). The protruded part 9g is formed at substantially centers of the side faces 9d and 9e, and the abutting face 9f is formed so as to surround the protruded part 9g. In this embodiment, only the abutting face 9f is protruded to an outer side of the holder 9 relative to both end portions in the right and left direction and in the front and rear direction and, in addition, only the protruded part 9g is protruded to an outer side of the holder 9 relative to the abutting faces 9f of the side faces 9d and 9e so that the shake correction coil 26 is directly wound around the protruded part 9g.

An upper end of the abutting face 9f is connected with an upper end face of the outer tube part 9b through a curved face part 9h formed in a convex curved surface shape. In other words, the upper end of the abutting face 9f is connected with an upper end face of the holder 9 through the curved face part 9h. Further, a lower end of the abutting face 9f is connected with a lower end face of the outer tube part 9b through a curved face part 9j formed in a convex curved surface shape. In other words, a lower end of the abutting face 9f is connected with a lower end face of the holder 9 through the curved face part 9j. Therefore, the abutting face 9f is formed at a position protruded to an outer side of the holder 9 relative to its upper end face and its lower end face of the holder 9.

A protruded part end face 9k in a flat face shape parallel to the abutting face 9f is formed on a tip end side of the protruded part 9g in a protruding direction of the protruded part 9g. In other words, the protruded part end face 9k in a flat face shape perpendicular to the right and left direction is formed on the tip end side (outer side end in the right and left direction) of the protruded part 9g formed on the side face 9d. Further, the protruded part end face 9k in a flat face shape perpendicular to the front and rear direction is formed on the tip end side (outer side end in the front and rear direction) of the protruded part 9g formed on the side face 9e.

A protruded part 9m as a second protruded part which is further protruded from the protruded part end face 9k to an outer side of the holder 9 is formed on a tip end side of the protruded part 9g. In other words, the protruded part 9g of the side face 9d is formed with the protruded part 9m protruded to an outer side in the right and left direction, and the protruded part 9g of the side face 9e is formed with the protruded part 9m protruded to an outer side in the front and rear direction. The protruded part 9m formed on the protruded part 9g of the side face 9d is formed in a substantially rectangular shape whose longitudinal direction is the front and rear direction and its short-side direction is the upper and lower direction when viewed in the right and left direction. The protruded part 9m formed on the protruded part 9g of the side face 9e is formed in a substantially rectangular shape whose longitudinal direction is the right and left direction and its short-side direction is the upper and lower direction when viewed in the front and rear direction. The protruded part 9m is formed at a substantially center of the protruded part 9g, and the protruded part end face 9k is formed so as to surround the protruded part 9m.

The shake correction coil 26 is wound around a side face of the protruded part 9g. In this embodiment, the shake correction coil 26 is wound around the side face of the protruded part 9g by alignment winding. As described above, a shape of the protruded part 9g around which the shake correction coil 26 is directly wound is a substantially rectangular shape whose short-side direction is the upper and lower direction when viewed in the front and rear direction or viewed in the right and left direction. Therefore, the shake correction coil 26 is wound around the protruded part 9g so that the short-side direction of the shake correction coil 26 and the upper and lower direction are coincided with each other. An inner peripheral face of the shake correction coil 26 is contacted with the side face of the protruded part 9g over the entire periphery.

As described above, one end face in the thickness direction of the shake correction coil 26 is abutted with the abutting face 9f. In this embodiment, a distance "D" (see FIG. 6) between the abutting face 9f and the protruded part end face 9k is equal to the thickness of the shake correction coil 26. In other words, the distance "D" in the right and left direction between the abutting face 9f and the protruded part end face 9k on the side face 9d is equal to the thickness of the shake correction coil 26. Further, the distance "D" in the front and rear direction between the abutting face 9f and the protruded part end face 9k on the side face 9e is equal to the thickness of the shake correction coil 26. Therefore, the other end face in the thickness direction of the shake correction coil 26 and the protruded part end face 9k are located on the same flat plane as each other.

A terminal pin 36 is formed of metal material having high conductivity such as copper alloy. Further, the terminal pin 36 is formed in a polygonal column shape. Specifically, the terminal pin 36 is formed in a quadrangular column shape (rectangular bar shape). The terminal pin 36 is fixed to a lower end face of the holder 9. Specifically, the terminal pin 36 is fixed to a lower end face of the outer tube part 9b by press fitting or the like so as to protrude from the lower end face of the outer tube part 9b to a lower side on inner sides of the respective abutting faces 9f of the side faces 9d and 9e. Further, two terminal pins 36 are disposed on a lower side of each of the side faces 9d and 9e.

Two terminal pins 36 disposed to a lower side of the side face 9d are disposed with a predetermined space therebetween in the front and rear direction. An end part on a winding-start side of the shake correction coil 26 is bound around one of two terminal pins 36 and an end part on a winding-end side of the shake correction coil 26 is bound around the other of the two terminal pins 36. Two terminal pins 36 disposed to a lower side of the side face 9e are disposed with a predetermined space therebetween in the right and left direction. An end part on a winding-start side of the shake correction coil 26 is bound around one of two terminal pins 36 and an end part on a winding-end side of the shake correction coil 26 is bound around the other of the two terminal pins 36. Further, the two terminal pins 36 disposed to a lower side of the side face 9d are disposed on an inner side in the front and rear direction relative to the side faces in the front and rear direction of the protruded part 9g. The two terminal pins 36 disposed to a lower side of the side face 9e are disposed on an inner side in the right and left direction relative to the side faces in the right and left direction of the protruded part 9g.

In a case that the shake correction coil 26 is directly wound around the protruded part 9g, when a side face portion of the protruded part 9g with which a winding-start side portion of the shake correction coil 26 is first come into contact is referred to as a winding-start contact part 9p (see FIG. 6), a coil introducing part 9r which is recessed from the abutting face 9f is formed on the side faces 9d and 9e between the winding-start contact part 9p and the terminal pin 36 to which an end part on a winding-start side of the shake correction coil 26 is fixed. One side face in the front and rear direction of the protruded part 9g is the winding-start contact part 9p on the side face 9d, and one side face in the right and left direction of the protruded part 9g is the winding-start contact part 9p on the side face 9e.

The coil introducing part 9r is formed between a lower end face of the outer tube part 9b and a lower end of the winding-start contact part 9p in the upper and lower direction. A width of the coil introducing part 9r is set to be gradually wider as going toward a lower side. In other words, a width in the front and rear direction of the coil introducing part 9r formed on the side face 9d is set to be gradually wider as going toward a lower side, and a shape of the coil introducing part 9r when viewed in the right and left direction is a substantially right-angled triangular shape. Further, a width in the right and left direction of the coil introducing part 9r formed on the side face 9e is set to be gradually wider as going toward a lower side, and a shape of the coil introducing part 9r when viewed in the front and rear direction is a substantially right-angled triangular shape.

A recessed amount of the coil introducing part 9r from the abutting face 9f is set to be an outer diameter of a conducting wire structuring the shake correction coil 26 or more (not less than an outer diameter of the conducting wire). For example, a recessed amount from the abutting face 9f of the coil introducing part 9r is equal to an outer diameter of a conducting wire structuring the shake correction coil 26.

Similarly to the lower end of the abutting face 9f, a lower end of the coil introducing part 9r is connected with a lower end face of the outer tube part 9b through a curved face part 9v formed in a convex curved surface shape. Therefore, the terminal pin 36 is protruded from the lower end face of the outer tube part 9b on an inner side relative to the curved face part 9v.

In this embodiment, an end part on the winding-start side of the shake correction coil 26 is fixed to the terminal pin 36 and, after that, its end part on the winding-start side is led to the winding-start contact part 9p along an inclined face 9s of the coil introducing part 9r formed on a line connecting the terminal pin 36 with the winding-start contact part 9p (see FIG. 6). In other words, a conducting wire for structuring the shake correction coil 26 is bound around and fixed to the terminal pin 36 and then, the conducting wire is extended to the winding-start contact part 9p along the inclined face 9s of the coil introducing part 9r and is wound around the protruded part 9g. In this embodiment, a side face of the protruded part 9g in the front and rear direction or the right and left direction on an opposite side to the side face of the winding-start contact part 9p is referred to as a non-winding-start contact part 9t (see FIG. 6), a recessed part 9u similarly formed to the coil introducing part 9r is also formed between the non-winding-start contact part 9t and the terminal pin 36 to which an end part on a winding-end side of the shake correction coil 26 is fixed. Similarly to the lower end of the coil introducing part 9r, a lower end of the recessed part 9u is connected with the lower end face of the outer tube part 9b through a curved face part 9w formed in a convex curved surface shape.

A flexible printed circuit board 37 is provided with a terminal connected part 37a disposed along the lower end face of the outer tube part 9b and a leading-out part 37b which is extended from the terminal connected part 37a. As shown in FIG. 5, an under face of the terminal connected part 37a is formed with a solder land 37c to which the terminal pin 36 is soldered. The solder land 37c is formed along an edge of a cut-out part in a substantially "D"-shape where a part of the terminal pin 36 is disposed. In accordance with an embodiment of the present invention, the solder land 37c may be formed along an edge of a through-hole into which the terminal pin 36 is inserted.

(Winding Method for Shake Correction Coil)

Figure 7:
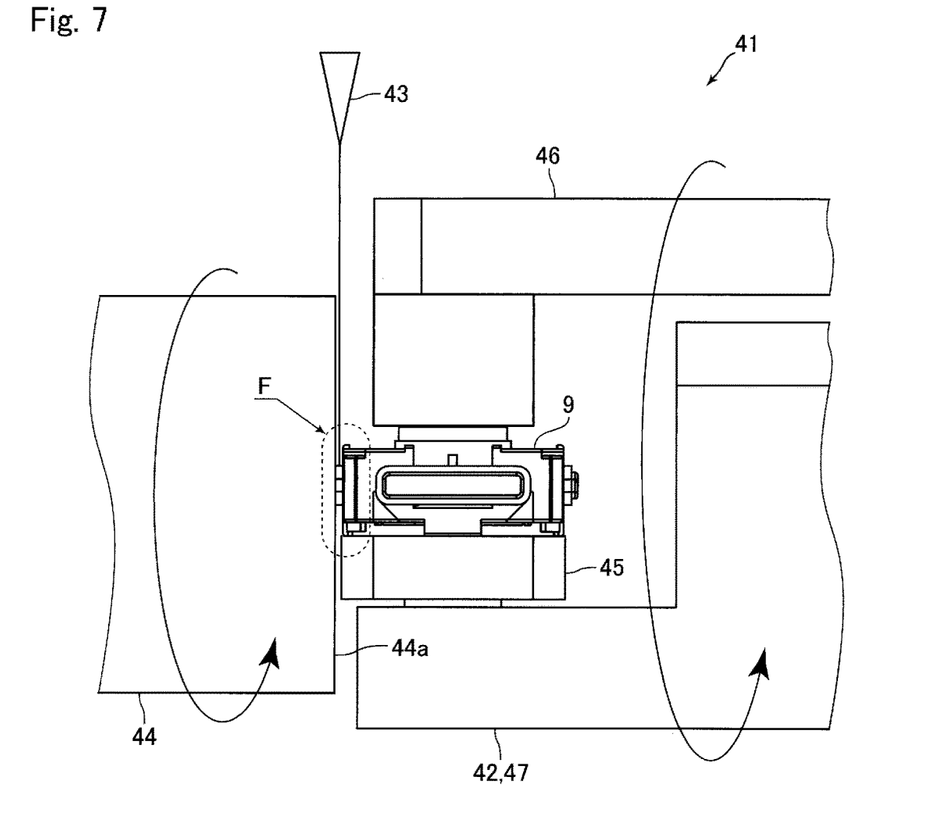
FIG. 7 is a schematic view showing a winding device for winding a shake correction coil to the holder shown in FIG. 4.
Figure 8:
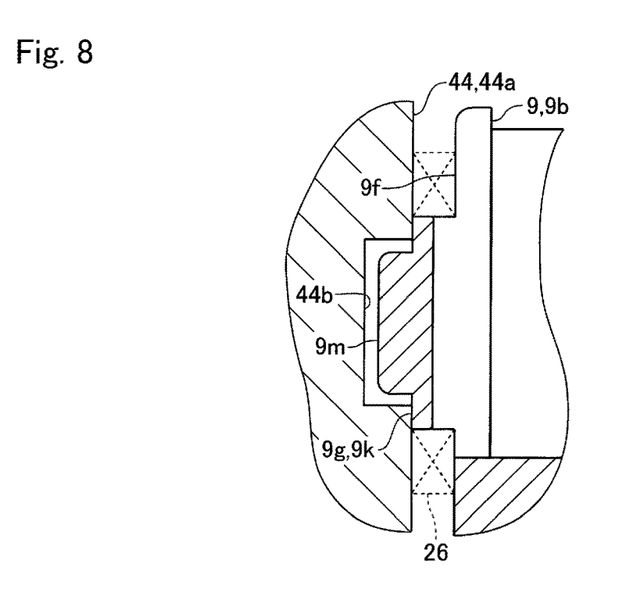
FIG. 8 is an explanatory enlarged cross-sectional view showing a structure of the "F" part in FIG. 7.

FIG. 7 is a schematic view showing a winding device 41 for winding the shake correction coil 26 to the holder 9 shown in FIG. 4. FIG. 8 is an explanatory enlarged cross-sectional view showing a structure of the "F" part in FIG. 7.

Winding of the shake correction coil 26 around the protruded part 9g of the holder 9 is performed by using a winding device 41. As shown in FIG. 7, the winding device 41 includes a winding main body part 42 to which the holder 9 is fixed, a rotation mechanism (not shown) structured to rotate the winding main body part 42, a supply nozzle 43 configured to supply a conducting wire for structuring the shake correction coil 26, and a subordinate head 44 rotated together with the winding main body part 42. The winding main body part 42 includes a holder mounting part 45 on which the holder 9 is mounted, a clamp part 46 which sandwiches the holder 9 together with the holder mounting part 45 to fix the holder 9, and a base part 47 which turnably holds the holder mounting part 45 with the upper and lower direction in FIG. 7 as an axial direction of turning and holds the clamp part 46 movably in the upper and lower direction in FIG. 7. The winding main body part 42 can be rotated with the right and left direction in FIG. 7 as an axial direction of rotation.

The subordinate head 44 is linearly movable in the right and left direction in FIG. 7. Further, the subordinate head 44 can be rotated with the right and left direction in FIG. 7 as an axial direction of rotation. The subordinate head 44 is connected with a rotation mechanism structured to rotate the subordinate head 44, and the winding main body part 42 and the subordinate head 44 are rotated synchronously. Further, the subordinate head 44 is formed with a contact face 44*a* in a flat face shape configured to contact with the protruded part end face 9*k* of the holder 9. Further, the subordinate head 44 is, as shown in FIG. 8, formed with a recessed part 44*b* to which the protruded part 9*m* is inserted.

In order to wind the shake correction coil 26 around the protruded part 9*g* by using the winding device 41, first, a holder 9 is fixed to the winding main body part 42 and an end part on a winding-start side of the shake correction coil 26 is bound around and fixed to the terminal pin 36. After that, the subordinate head 44 is moved so that the protruded part 9*m* is disposed in the recessed part 44*b* of the subordinate head 44 and the contact face 44*a* is pressed against the protruded part end face 9*k*. When the contact face 44*a* is abutted with the protruded part end face 9*k*, a distance between the contact face 44*a* and the abutting face 9*f* is equal to the thickness of the shake correction coil 26. In this state, while supplying a conducting wire from the supply nozzle 43, the winding main body part 42 and the subordinate head 44 are rotated together and thereby the shake correction coil 26 is wound around the protruded part 9*g*. Further, when the shake correction coil 26 has been wound around the protruded part 9*g*, an end part on a winding-end side of the shake correction coil 26 is bound around and fixed to the terminal pin 36.

After the end part on the winding-end side of the shake correction coil 26 is bound around and fixed to the terminal pin 36, the holder mounting part 45 is turned by 90° with respect to the base part 47 and then, similarly, the shake correction coil 26 is wound around the next protruded part 9*g*. In this manner, the shake correction coils 26 are successively wound to the respective side faces 9*d* and 9*e*. Each time winding of the shake correction coil 26 around the protruded part 9*g* is finished, the subordinate head 44 and the clamp part 46 are moved so that the holder mounting part 45 on which the holder 9 is mounted can be turned. Further, in this embodiment, a conducting wire structuring the shake correction coil 26 is a fusion wire having a fusion film. Each time winding of the shake correction coil 26 around each of the protruded parts 9*g* is finished, the shake correction coil 26 is heated together with the holder 9 and the conducting wires are fused to each other.

Principal Effects in this Embodiment

As described above, in this embodiment, the shake correction coils 26 are directly wound around the protruded parts 9*g* formed on the side faces 9*d* and 9*e* of the holder 9. In other words, in this embodiment, the shake correction coil 26 is attached to the holder 9 as it is by directly winding the shake correction coil 26 around the protruded part 9*g* by using the winding device 41. Therefore, in this embodiment, the shake correction coil 26 can be easily attached to the holder 9.

In this embodiment, the abutting face 9*f* with which one end face in the thickness direction of the shake correction coil 26 is abutted and the protruded part end face 9*k* of the protruded part 9*g* are parallel to each other, and the distance "D" between the abutting face 9*f* and the protruded part end face 9*k* are equal to the thickness of the shake correction coil 26. Therefore, in this embodiment, when the shake correction coil 26 is directly wound around the protruded part 9*g* in a state that the contact face 44*a* of the subordinate head 44 is pressed against the protruded part end face 9*k*, the shake correction coil 26 is orderly wound around the protruded part 9*g* while preventing winding collapse of the shake correction coil 26.

In this embodiment, the coil introducing part 9*r* which is recessed from the abutting face 9*f* is formed on the side faces 9*d* and 9*e* between the winding-start contact part 9*p* and the terminal pin 36 to which an end part on a winding-start side of the shake correction coil 26. Further, a recessed amount of the coil introducing part 9*r* from the abutting face 9*f* is set to be an outer diameter of a conducting wire structuring the shake correction coil 26 or more. Therefore, according to this embodiment, when the shake correction coil 26 is to be wound around the protruded part 9*g* by alignment winding, a conducting wire of the second and succeeding windings for the shake correction coil 26 can be prevented from riding on the conducting wire of the winding-start for the shake correction coil 26 which is disposed between the winding-start contact part 9*p* and the terminal pin 36 to which an end part on the winding-start side is fixed. Accordingly, in this embodiment, the shake correction coil 26 can be orderly wound around the protruded part 9*g* by alignment winding.

In this embodiment, the terminal pin 36 is fixed to a lower end face of the holder 9 so as to protrude from the lower end face of the outer tube part 9*b* to a lower side at positions on inner sides relative to the respective abutting faces 9*f* of the side faces 9*d* and 9*e*. Therefore, according to this embodiment, when the shake correction coil 26 is to be directly wound around the protruded part 9*g* protruding to an outer side of the holder 9, a wire for winding the shake correction coil 26 is prevented from being caught by the terminal pin 36. Further, in this embodiment, the upper end of the abutting face 9*f* is connected with the upper end face of the outer tube part 9*b* through the curved face part 9*h*, and the lower end of the abutting face 9*f* is connected with the lower end face of the outer tube part 9*b* through the curved face part 9*j*. Therefore, when the shake correction coil 26 is to be directly wound around the protruded part 9*g* protruding from the abutting face 9*f*, a wire for winding the shake correction coil 26 is restrained from being caught at boundary portions between the both upper and lower end faces of the outer tube part 9*b* and the abutting face 9*f*. Further, in this embodiment, the lower end of the coil introducing part 9*r* is connected with the lower end face of the outer tube part 9*b* through the curved face part 9*v*, and the lower end of the recessed part 9*u* is connected with the lower end face of the outer tube part 9*b* through the curved face part 9*w*. Therefore, when the shake correction coil 26 is to be directly wound around the protruded part 9*g*, a wire for winding the shake correction coil 26 is restrained from being caught at boundary portions between the lower end face of the outer tube part 9*b* and the coil introducing part 9*r* and the recessed part 9*u*.

In this embodiment, the terminal pin 36 is formed in a quadrangular column shape. Therefore, according to this embodiment, loosening of an end part of the shake correction coil 26 bound around the terminal pin 36 is prevented. Further, in this embodiment, a width of the coil introducing part 9*r* is set to be gradually wider as going to a lower side and thus the holder 9 can be relatively easily manufactured by using a die structured to be divided in the upper and lower direction.

In this embodiment, the protruded part 9*g* is formed with a protruded part 9*m* which is protruded from the protruded part end face 9*k* to an outer side of the holder 9. Therefore, in this embodiment, when the coil unit 35 is handled, the shake correction coil 26 is hard to be contacted with external members. Therefore, according to this embodiment, damage of the shake correction coil 26 due to handling of the coil unit 35 can be prevented. Further, the contact face 44a of the subordinate head 44 is abutted with only an outer peripheral part of the protruded part end face 9k and thus accuracy of a distance between the contact face 44a and the abutting face 9f can be enhanced. Further, according to this embodiment, in the photographing optical device 1, the shake correction coil 26 can be prevented from being contacted with the shake correction magnet 27 oppositely disposed to the shake correction coil 26 by the protruded part 9m.

Other Embodiments

Although the present invention has been shown and described with reference to a specific embodiment, various changes and modifications will be apparent to those skilled in the art from the teachings herein.

In the embodiment described above, one protruded part 9g is formed on the side faces 9d and 9e, and one shake correction coil 26 is wound around one protruded part 9g. However, the present invention is not limited to this embodiment. For example, each of the side faces 9d and 9e may be formed with two or more protruded parts around which one shake correction coil 26 is wound. In this case, the side face 9d is formed with two or more protruded parts with a space therebetween in the front and rear direction, and the side face 9e is formed with two or more protruded parts with a space therebetween in the right and left direction.

In the embodiment described above, the shake correction coil 26 is wound around each of the protruded parts 9g of the two side faces 9d, and the shake correction coil 26 is wound around each of the protruded parts 9g of the two side faces 9e. However, the present invention is not limited to this embodiment. For example, the shake correction coil 26 is wound around each of the protruded parts 9g of the two side faces 9d and no shake correction coil 26 is wound around the protruded parts 9g of the two side faces 9e. Further, the shake correction coil 26 is wound around each of the protruded parts 9g of the two side faces 9e and no shake correction coil 26 is wound around the protruded parts 9g of the two side faces 9d. Further, the shake correction coil 26 is wound around the protruded part 9g of one side face 9d and the protruded part 9g of one side face 9e, and no shake correction coil 26 is wound around the protruded part 9g of the other side face 9d and the protruded part 9g of other side face 9e.

In the embodiment described above, the terminal pin 36 is fixed to the lower end face of the outer tube part 9b so as to protrude from the lower end face of the outer tube part 9b to a lower side. However, the terminal pin 36 may be fixed to an outer peripheral face of the outer tube part 9b. In this case, for example, the terminal pin 36 is disposed in a recessed part formed on the outer peripheral face of the outer tube part 9b so that the shake correction coil 26 is not caught by the terminal pin 36 when the shake correction coil 26 is to be directly wound around the protruded part 9g. Further, in the embodiment described above, the terminal pin 36 is formed in a polygonal column shape. However, the terminal pin 36 may be formed in a cylindrical column shape or may be formed in an elliptical column shape.

In the embodiment described above, the shape of the coil introducing part 9r is a substantially right angled triangular shape when viewed in the right and left direction or the front and rear direction. However, the shape of the coil introducing part 9r when viewed in the right and left direction or the front and rear direction may be a straight shape formed by connecting the winding-start contact part 9p with the terminal pin 36 to which an end part on the winding-start side of the shake correction coil 26 is fixed. Further, in the embodiment described above, the recessed part 9u is formed between the non-winding-start contact part 9t and the terminal pin 36 to which an end part on the winding-end side of the shake correction coil 26 is fixed. However, no recessed part 9u may be formed.

In the embodiment described above, the terminal pins 36 are soldered to the flexible printed circuit board 37. However, the terminal pin 36 may be soldered and fixed to a rigid circuit board. Further, in the embodiment described above, the protruded part 9m is formed on the tip end side of the protruded part 9g, but no protruded part 9m may be formed. In this case, the recessed part 44b is not required to be formed in the subordinate head 44 and thus the structure of the subordinate head 44 can be simplified.

In the embodiment described above, an outward form of the holder 9 when viewed in the optical axis direction is a substantially square shape. However, an outward form of the holder 9 when viewed in the optical axis direction may be a substantially rectangular shape or may be a substantially regular hexagonal shape, a substantially regular octagonal shape or the like. Further, in the embodiment described above, the coil unit 35 is mounted on a photographing optical device 1. However, the coil unit 35 may be mounted on a device other than a photographing optical device 1. In other words, the coil in accordance with at least an embodiment of the present invention may be a coil other than the shake correction coil 26.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A coil unit comprising:
   a plurality of coils, each coil of the plurality of coils being formed in a substantially rectangular frame shape; and
   a coil holding member structured to hold the plurality of coils;
   wherein a direction which is perpendicular to a parallel direction to a long side of the coil and is perpendicular to a parallel direction to a short side of the coil is defined as a direction of a thickness of the coil,
   an outer peripheral face of the coil holding member comprises two side-face pairs, each of which is comprised of a pair of side faces parallel to each other, the two side-face pairs being disposed so as to be perpendicular to each other;
   wherein each side face of the two side-face pairs holds one of the plurality of coils;
   wherein the each side face comprises:
   an abutting face in a flat face shape with which an end face in the thickness direction of one coil of the plurality of coils is abutted;

a protruded part which is protruded to an outer side from the abutting face so that the one coil is directly wound around the protruded part; and two terminal pins made of metal with which end parts of the one coil are bound and electrically connected;

wherein a protruded part end face in a flat face shape which is parallel to the abutting face is formed on a tip end side of the protruded part in a protruding direction of the protruded part;

wherein a distance between the abutting face and the protruded part end face is equal to the thickness of the coil;

wherein a direction which is perpendicular to a perpendicular direction to the side faces structuring one of the two side-face pairs and is perpendicular to a perpendicular direction to the side faces structuring the other of the two side-face pairs is referred to as a first direction, the two terminal pins are fixed to one end face of the each side face in the first direction of the coil holding member so as to protrude in the first direction;

wherein the each side face from which the protruded part is protruded further comprises a coil introducing part which is provided on the abutting face so as to be recessed from the abutting face between the protruded part and one of the two terminal pins; and wherein each of both ends of the abutting face in the first direction of the each side face is connected with each of both end faces in the first direction of the each side face through a curved face part formed in a convex curved surface shape so that the one coil is directly wound around the protruded part.

2. The coil unit according to claim 1, wherein the terminal pin is formed in a polygonal column shape.

3. The coil unit according to claim 2, wherein
in a case that a side face portion of the protruded part with which a winding-start side portion of the coil is first come into contact when the coil is to be directly wound around the protruded part is referred to as a winding-start contact part,
the coil introducing part is formed between the winding-start contact part and the terminal pin to which an end part on a winding-start side of the coil is fixed.

4. The coil unit according to claim 3, wherein a recessed amount of the coil introducing part from the abutting face is equal to or more than an outer diameter of a conducting wire structuring the coil or more.

5. The coil unit according to claim 4, wherein the recessed amount of the coil introducing part from the abutting face is equal to the outer diameter of the conducting wire.

6. The coil unit according to claim 3, wherein a width of the coil introducing part in a second direction which is perpendicular to the thickness direction of the coil and the first direction becomes wider as going to the one end face in the first direction of the coil holding member to which the terminal pin is fixed.

7. The coil unit according to claim 6, wherein a recessed amount of the coil introducing part from the abutting face is equal to or more than an outer diameter of a conducting wire structuring the coil or more.

8. The coil unit according to claim 2, further comprising a circuit board having a solder land to which the terminal pin is soldered.

9. The coil unit according to claim 1, further comprising a second protruded part which is formed on the protruded part so as to protrude from the protruded part end face to an outer side of the coil holding member.

10. The coil unit according to claim 9, wherein
the abutting face, the protruded part and the second protruded part are formed on each of the side faces, and
each of both ends of the abutting face in the first direction is connected with each of both end faces of the coil holding member in the first direction through a curved face part formed in a convex curved surface shape.

11. A photographing optical device comprising:
the coil unit of claim 1;
a camera module comprising a lens and an imaging element, the camera module being fixed to the coil holding member;
a support body which swingably holds the coil unit;
drive magnets which are fixed to the support body and are oppositely disposed to the coil.

12. The photographing optical device according to claim 11, wherein the terminal pin is formed in a polygonal column shape.

13. The photographing optical device according to claim 12, wherein
in a case that a side face portion of the protruded part with which a winding-start side portion of the coil is first come into contact when the coil is to be directly wound around the protruded part is referred to as a winding-start contact part,
the coil introducing is formed between the winding-start contact part and the terminal pin to which an end part on a winding-start side of the coil is fixed.

14. The photographing optical device according to claim 11, wherein the protruded part of the coil unit comprises a second protruded part so as to protrude from the protruded part end face to an outer side of the coil holding member.

* * * * *